ns
2,954,408

METHOD OF PREPARING TECHNICALLY PURE γ-HEXACHLORCYCLOHEXANE IN A CYCLIC PROCESS

Paulus Jacobus Petrus Samwel, Weesp, Netherlands, assignor, by mesne assignments, to North American Philips Company, Inc., New York, N.Y., a corporation of Delaware No Drawing. Filed Oct. 21, 1955, Ser. No. 542,085

Claims priority, application Netherlands Oct. 22, 1954

2 Claims. (Cl. 260—648)

It is known that the insecticide hexachlorcyclohexane as produced in the additive chlorination of benzene consists of a mixture of a plurality of isomers ($\alpha,\beta,\gamma,\delta,\epsilon$), of which substantially only the γ-isomer has an insecticide effect.

For separating the γ-isomer from the other isomers several methods are known, substantially all of which relate to the differences in solubility of the isomers in solvents. For most solvents the solubility of the δ-isomer (which is to be understood to include also the ε-isomer and isomers other than the α, β and γ-isomers is many times greater than that of the γ-isomer, whilst the solubility of the latter is many times greater than that of the isomers α and β. Several solvents have been suggested for this selective crystallisation, for example lower aliphatic alcohols, benzene, cyclohexane, decahydronaphthalene, chloroform, dichlorethylene. The advantages afforded by the use of lower alcohols, more particularly methanol, have become particularly manifest.

Several methods have been suggested for obtaining γ-isomer of maximum purity in the crystallisation of γ-isomer from an oversaturated solution which also contains other isomers.

Thus, it would be possible to separate the γ-isomer by evaporating an alcoholic extract of crude hexachlorcyclohexane (in which the alcohol is an aliphatic alcohol containing at most 5 carbon atoms) up to about 40% of its initial volume and to crystallize the γ-isomer from the concentrated solution by means of static crystallisation. It is to be noted that in the extraction of crude hexachlorcyclohexane by the above-mentioned method, a separation of the γ- and δ-isomers from the α- and β-isomers is obtained, since the latter two isomers dissolve in the said alcohols much less readily than the two first-mentioned isomers.

In another method use is made of the good solubility of the δ-isomer by working crude hexa to form a paste with the air of methyl alcohol, mixing this paste with an amount of cold methanol and subsequently pressing out the whole. The main mass which remains contains substantially all α-, β- and γ-isomers, whereas the press juice contains the δ-isomers and small amounts of the γ-isomer.

In a similar method an extraction is carried out with aqueous methanol. The method may be carried out as a cyclic process and for this purpose the filtrates obtained are used for the extraction of new amounts of crude hexachlorcyclohexane.

According to the recognition underlying a further method, this γ/δ separation which precedes the crystallisation of the γ-isomer would be necessary for carrying out a selective γ-crystallisation, since the δ-isomer would adversely affect the crystallisation of the γ-isomer. According to the said method, crude hexachlorcyclohexane is completely dissolved in a lower aliphatic alcohol at temperature comprised between 40° and 100° C., whereupon the isomers α, β and γ are allowed to crystallize by cooling and the mother liquor is removed to use it in the extraction of a new charge of crude hexachlorcyclohexane. The crystallisate consisting of α, β and γ-isomers is finally again subjected to an α, β/γ-separation.

The retarding influence of the δ-isomer on crystallisation could also extend to the α- and β-isomers. In a method based on this recognition, the influence retarding crystallisation is utilised to crystallize the γ-isomer selectively by evaporation from a solution supersaturated with α- and β-isomers. This result could be obtained by providing that the solution supersaturated with α-, β- and γ-isomers contains between 20% by weight and 50% by weight of the δ-isomer. This method could also be used in a cyclic process. In order to avoid that an accumulation of the δ-isomer may occur in the crystallisation liquid, a portion of the δ-isomer must each time be removed from the liquid flowed back into the cycle, the quantity thereof, for example, being so chosen that it contains an amount by weight of the δ-isomer equal to that which would be introduced into the cycle by extraction of a new portion of crude hexachlorcyclohexane.

Several of the said methods have disadvantages.

Thus, the method having for its purpose to separate the δ-isomer from the α-, β- and δ-isomers by pre-extraction with methanol or aqueous methanol has the disadvantage of being not particularly selective, so that together with the δ-isomer an appreciable amount of the γ-isomer is extracted from the process.

Said disadvantage is inherent to a lesser extent in the method in which the concentration of δ-isomer in the crystallisation liquid is maintained at a value of from 20% to 50% by weight, but a disadvantage of this method is, apart from what is mentioned hereinafter, that the concentration of solid substance and hence the viscosity is high.

A cyclic process for manufacturing technically pure γ-isomer could be developed, which does not exhibit the aforesaid disadvantages.

It is to be noted that in connection with the present invention the term "cyclic process" is to be understood to mean a process in which a substance is subjected to liquid extraction, the extract is crystallized and the mother liquor is used wholly or in part and, if necessary, supplemented with fresh extraction liquid to subject the substance to a second or subsequent extraction or to subject a new portion thereof to first extraction.

The mother liquor may be supplemented with mother liquors obtained after recrystallisation of crystallised γ-isomer or with washing liquids of the crystallisate or with fresh extraction liquid or, if desired, with mixtures of the aforementioned liquids.

According to the invention, technically pure δ-hexachlorocyclohexane is manufactured in a cyclic process by subjecting crude hexachlorcyclohexane to a pre-extraction with part of the mother liquor from preceding extractions of other portions of crude hexachlorcyclohexane, the amounts of the mother liquor being so chosen that the amount of δ-isomer carried off with the pre-extract is equal to that present in the crude hexachlorcyclohexane, whereafter the residue of the crude hexachlorcyclohexane thus treated is subjected to a main extraction with the remainder of the mother liquor from preceding extractions, this extract being evaporated in part and the residue crystallised after a content of from 5% to 15% of δ-isomer has been reached.

In this cyclic process, pre-extraction is necessary to avoid accumulation of the δ-isomer in the collected mother liquors after repeated extractions of new portions of hexachlorcyclohexane. The pre-extract contains, in addition to the δ-isomer, the γ-isomer, but the amounts of the last-mentioned isomer are small with respect to the amount of γ-isomer left behind in the residue, since the pre-extraction is carried out with only a small amount of mother liquor.

The mother liquor used for the main extraction may have added to it fresh solvent or any washing liquids of recrystallised amounts of γ-isomer or mother liquors obtained in such recrystallisations.

The main extraction is preferably carried out with an amount of mother liquor such that the extract is saturated with the γ-isomer. Extractions with smaller or larger amounts of mother liquor can also be carried out, but they adversely affect the economy of the process. The proper amount of mother liquor may readily be calculated from the composition thereof and the solubility of the γ-isomer in a mother liqor of known composition. Although several solvents may be used for the method according to the invention, it is advantageous to utilize for this purpose lower aliphatic alcohols, for example methanol.

The limit of 5% by weight of δ-isomer has been chosen to form a clear separation from those technics, according to which the δ-isomer is crystallized by evaporation from a solution which contains α- and β-isomers, but which does not contain the γ-isomer, since the latter isomer was removed by means of pre-extraction of the crude hexachlorcyclohexane. The maximum limit of 15% by weight of δ-isomer has been chosen to form a clear separation from those technics, according to which a content of from 20% to 50% of δ-isomer is maintained in the crystallisation liquid.

The invention will now be explained with reference to the example following hereinafter.

EXAMPLE

*Mother liquor $M_1$*

Composition: Percent
α+β-isomer _____ 5
γ-isomer _____ 8
δ-isomer _____ 11
Solvent (methanol) _____ 76

*Mother liquor $M_2$*

Composition:
α+β-isomer _____ 0.5
γ-isomer _____ 7.8
δ-isomer _____ 
Solvent (methanol) _____ 92.7

4.4 kgs. of dried and ground hexachlorcyclohexane consisting for 15% (=0.66 kg.) of γ-isomer, for 75% (=3.3 kg.) of α+β-isomers and for the remaining part (=0.44 kg.) of δ-isomer are stirred for 30 minutes at 20° C. with 1.7 litres of mother liquor $M_1$ of a preceding charge and of which the composition is specified above. The liquid is separated from the solid material by centrifuging. The liquid has a volume of 1.6 litres containing 0.11 kg. of γ-isomer, 0.05 kg. of α+β-isomers and 0.44 kg. of δ-isomer. The amount of δ-isomer introduced with the crude hexa is thus carried off again. The solid material which remained after centrifuging is stirred for 1 hour at 65° C. with 15.3 litres of the above-mentioned mother-liquor $M_1$, 5 litres of mother liquor $M_2$ obtained from the recrystallization of the γ-isomer, the composition of which is also specified above, and 10.2 litres of methanolic washing liquid W, subsequently cooled down to 20° C. and stirred at this temperature for half an hour. The liquid was again separated from the solid material by centrifuging. The product obtained was 31 litres of liquid containing 2.15 kgs. of γ-isomer, 0.75 kg. of α+β-isomers and 1.7 kg. of δ-isomer. Besides, a solid material was separated and subsequently washed with 10.5 litres of methanol of 50° C. The resultant product was 10.2 litres of washing liquid which was used again in the cyclic process (indicated above by W). The washed solid material, after drying, weighed 3.3 kg. and consisted, besides for 1.5% of γ, of α+β-isomers.

43.5%=13.5 litres were evaporated from the 31 litres of solution. The solution concentrated by evaporation was slowly cooled down to room temperature (within 18 hours). During this process crude γ-isomer deposited which was filtered from the mother liquor. The yield was 0.85 kg. of crude γ-isomer having a content of 97.6%. The mother liquor had a composition as indicated hereinbefore by $M_1$. The crude γ-isomer was recrystallized from 5 litres of methanol. The mother liquor has the composition as indicated hereinbefore for the mother liquor $M_2$. One obtained 0.5 kg. of lindane having a purity of 99.7%. The yield of lindane, calculated on the introduced amount of γ-isomer (0.66 kg.), was 76%.

The content of the different isomers was determined by polarographic means.

What is claimed is:

1. A cyclic process for the production of technically pure γ-hexachlorocyclohexane by extraction of crude hexachlorocyclohexane, containing the γ, δ and other isomers with a lower aliphatic alcohol, in which process mother liquors of preceding extractions are reintroduced in said cyclic process, the undissolved α- and β-isomers are removed, the resultant extract is concentrated by evaporation and the γ-isomer is crystallized out of said concentrated extract by the cooling of said extract and part of the γ-isomer is withdrawn from the cyclic process, comprising the steps: extracting a fresh portion of crude hexachlorocyclohexane with a relatively small portion of mother liquor of a preceding cyclic process giving a solid pre-extract containing about the same amount of δ-isomer as said portion of crude hexachlorocyclohexane, withdrawing said solid pre-extract from the cyclic process, extracting said solid pre-extract with the remaining part of said mother liquor employed in said pre-extraction, a second mother liquor of a previous extraction of the crude hexachlorocyclohexane in a previous cyclic process, wash liquids obtained from crystallizations of the γ-isomer in previous cyclic processes and a sufficient quantity of a lower aliphatic alcohol to bring the volume of the liquid employed in said extraction to the desired level thereby producing a main extract, evaporating part of the alcohol from the main-extract until the concentration of the γ-isomer in said main extract lies between about 5 and 15% to the desired level, cooling said evaporated extract to room temperature thereby crystallizing out the γ-isomer and producing a mother liquor, part of said mother liquor being used for the pre-extraction of a fresh portion of crude hexachlorocyclohexane and the remaining part of said mother liquor being used for the main extraction of pre-extracted hexachlorocyclohexane.

2. A cyclic process for the production of technically pure γ-hexachlorocyclohexane by extraction of crude hexachlorocyclohexane, containing the γ, δ and other isomers with methanol, in which process mother liquors of preceding extractions are reintroduced in said cyclic process, the undissolved α- and β-isomers are removed, the resultant extract is concentrated by evaporation and the isomer is crystallized out of said concentrated extract by the cooling of said extract and part of the γ-isomer is withdrawn from the cyclic process, comprising the steps: extracting a fresh portion of crude hexachlorocyclohexane with a relatively small portion of mother liquor of a preceding cyclic process giving a solid pre-extract containing about the same amount of δ-isomer as said portion of crude hexachlorocyclohexane, withdrawing said solid pre-extract from the cyclic process, extracting said solid pre-extract with the remaining part of said mother liquor employed in said pre-extraction, a second mother liquor of a previous extraction of the crude hexachlorocyclohexane in a previous cyclic process, wash liquids obtained from crystallizations of the γ-isomer in previous cyclic processes and a sufficient quantity of methanol to bring the volume of the liquid employed in said extraction to the desired level thereby producing a main extract, evaporating part of the methanol from the main-extract until the concentration of the γ-isomer in said main extract lies between about 5 and 15% to the desired level, cooling said evaporated extract to room temperature thereby crystallizing out the γ-isomer and producing a mother liquor, part of said mother liquor being used for the pre-extraction of a fresh portion of crude hexachlorocyclohexane and the remaining part of said mother liquor being used for the main extraction of pre-extracted hexachlorocyclohexane.

References Cited in the file of this patent

UNITED STATES PATENTS 2,574,165　　Bender et al. ＿＿＿＿＿＿＿＿ Nov. 6, 1951